United States Patent Office 3,483,010
Patented Dec. 9, 1969

3,483,010
METHOD OF APPLYING PARTICULATE MATTER TO A SURFACE
Andrew Glovatsky and Joseph B. Shinal, Seneca Falls, N.Y., assignors to Sylvania Electric Products Inc., a corporation of Delaware
No Drawing. Filed Oct. 3, 1966, Ser. No. 583,931
Int. Cl. B44d 1/094; B44c 1/08
U.S. Cl. 117—18          3 Claims

ABSTRACT OF THE DISCLOSURE

A method of applying phosphor particles to a surface, such as the face panel of a cathode ray tube, positioned in a first medium, for example, air, which comprises first forming a suspension of the particles and a second gaseous medium which has a molecular weight greater than air and dispensing the same over the surface to be coated.

This invention relates to methods of applying particulate matter to a surface and more particularly to a method for applying phosphor particles to the screen surface of a cathode ray tube.

A method currently in use, known as "dusting," is used mainly in the manufacture of screens for color television tubes and consists in first coating the screen surface with a tacky binder material and then dispensing phosphor particles in a cloud over the screen surface and letting them descend to the tacky surface where they adhere. It would be advantageous to reduce the dusting period; i.e., the time necessary to dispense the phosphor and settle it through the air to the screen surface, since this would result in better utilization of time and would provide consequent cost savings. Also, when dusting under present techniques, it is preferable to use phosphor particles whose average size is in the 12–15 micron range since this provides a phosphor dusting period with a time cycle consistent with mass production practices. However the 12–15 micron range is not necessarily the most appropriate for all phosphors; therefore, it would be advantageous if smaller particle size phosphors could be utilized without increasing the dusting period beyond that consistent with mass production practices.

Another advantage could be realized if phosphor charging could be reduced or eliminated since this phenomena may lead to uneven distribution of the particles on the support surface.

It is, therefore, an object of this invention to substantially reduce the above-cited disadvantages.

It is another object of the invention to enhance the manufacturing capabilities of cathode ray tubes.

Still another object of the invention is to provide a method of substantially decreasing the phosphor dusting period in the manufacture of cathode ray tubes.

Yet another object of the invention is to provide a method of achieving a substantially uniform phosphor coating.

These objects are achieved in one aspect of the invention by the provision of a method of applying particles to a surface positioned in a first medium which comprises the steps of forming a suspension of the particles and a second medium, wherein the second medium has a molecular weight greater than the first medium and dispensing the suspension of particles and the second medium over the surface.

It was discovered that this method decreases the dusting period since the particles are carried downwardly through the first medium not only by the force of gravity but also by the second medium with which they are in suspension since the second medium has a molecular weight greater than that of the first medium. The faster rate of descent which accrues from this method also provides a more even peripheral disposition of the particles since the faster descent lessens random motions. By the judicious selection of the second medium particle charging may virtually be eliminated thereby also resulting in a much more substantially uniform coating of the particles being applied to the surface.

For a better understanding of the present invention, together with other and further objects, advantages, and capabilities thereof, reference is made to the following disclosure and appended claims.

In more detail, a surface to be coated with particulate matter may be first provided with a layer of a tacky binder material so that the particulate matter will adhere thereto. In the case of a cathode ray tube the surface to be coated may be the curved inside surface of the face panel and the particulate matter may be particles of phosphor. The tacky binder material may be a photosensitized polyvinyl alcohol applied in a substantially even layer by any well-known means, e.g., spraying. The coated panel is then placed in a first medium preparatory to the dusting step. The first medium in most instances will be ordinary air having a molecular weight of 29; however, other gases may be utilized as will be discussed hereinafter.

The phosphor particles are drawn from a supply thereof to a mixing manifold where there is formed a suspension of the particles and a second medium or gaseous vehicle to carry the particles. To provide a substantial decrease in the dusting period the second medium has a molecular weight greater than that of the first medium. Where the first medium is air the second medium may be $CO_2$, for example, which has a molecular weight of 44. While the use of any gaseous vehicle having a molecular weight greater than that of the first medium will reduce the dusting period, further benefits are achieved if the gaseous vehicle is also relatively inert, at least with respect to the particles being dispensed. As mentioned above in regard to the dusting of phosphor particles, one of the causes of uneven distribution is particle charging. This charging, which is the actual build-up of electrostatic charges on the particles, is believed to be caused by the collision of the particles with air molecules and it causes the particles to clump together and thus prevents even distribution. The use of an inert gaseous vehicle substantially reduces this effect, apparently because the particles are now surrounded in their descent by the inert vehicle and thus are protected from collision with air molecules. Inert, heavier than air, gases that may be utilized with this invention include argon, krypton, and xenon.

As mentioned above it is not necessary to the practice of the invention that the first medium be air. For example, if the first medium be hydrogen then even helium may be used for the gaseous vehicle since its molecular weight is greater than that of the hydrogen.

As a more specific example, excellent results have been attained in the manufacture of screens for color cathode ray tubes when the tacky binder material used was a photosensitized polyvinyl alcohol, the red emitting phosphor was an europium activated yttrium vanadate, the green emitting phosphor was a silver activated zinc-cadmium sulfide and the blue emitting phosphor was a silver activated zinc sulfide; the first medium utilized was air and the gaseous vehicle was argon. The tubes formed with screens produced in accordance with the above showed phosphor particle charging had been substantially reduced; on the red and blue emitting phosphors it was practically nonexistent. The color emission was excellent as was life expectancy.

There has thus been provided a new and novel method of preparing screens which greatly reduces the dusting period. Further, it allows the use of smaller phosphor particles when this may be desirable. In the past it was always necessary to compromise between particle size and dusting period since, as the smaller the particle size became the longer became the dusting period, it took longer for the smaller sizes to settle.

While there has been described what is at present considered the preferred embodiment of the invention, it will be obvious to those skilled in the art that various changes and modifications may be made therein without departing from the invention.

What is claimed is:

1. In a method of forming a screen for a color cathode ray tube upon the interior surface of a face panel the steps comprising: applying on said interior surface a layer of a tacky binder composed of photosensitized polyvinyl alcohol; positioning said surface in a substantially horizontal plane with said binder uppermost; surrounding said surface with air; forming a suspension of phosphor particles and a gaseous vehicle having a molecular weight greater than air; dispensing said suspension in a cloud over said surface; and depositing said particles from said suspension upon said tacky binder through the action of said gaseous vehicle and the force of gravity.

2. The invention of claim 1 wherein said phosphor particles have an average size of 12 to 15 microns.

3. The invention of claim 2 wherein said gaseous vehicle is selected from the group consisting of argon, krypton, and xenon.

References Cited

UNITED STATES PATENTS

| 706,701 | 8/1902 | Thurston | 117—31 |
| 2,940,864 | 6/1960 | Watson | 117—33 X |
| 2,948,635 | 8/1960 | Koller | 117—33.5 |
| 3,097,103 | 7/1963 | Homer | 117—33.5 |
| 3,205,042 | 9/1965 | Jacobson | 23—208 |
| 3,212,914 | 10/1965 | Lyle et al. | 117—22 X |
| 3,249,462 | 5/1966 | Jung et al. | 117—71 |
| 3,287,157 | 11/1966 | Brown et al. | 117—31 X |
| 3,167,442 | 1/1965 | Brooks | 117—21 |
| 3,307,964 | 3/1967 | Jacobson | 117—71 |

FOREIGN PATENTS

| 340,636 | 1/1931 | Great Britain. |
| 453,507 | 9/1936 | Great Britain. |
| 804,958 | 11/1958 | Great Britain. |

WILLIAM D. MARTIN, Primary Examiner

U.S. Cl. X.R.

117—33, 33.5